May 6, 1947.                        A. THOMAS                        2,420,270
                              LAMINATED OPTICAL FILTER
                              Filed Aug. 25, 1943
FIG. 1                               FIG. 2
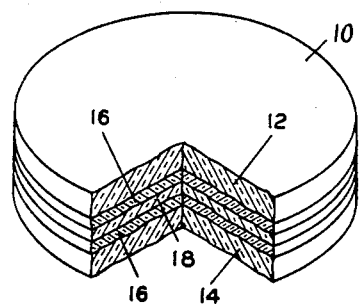
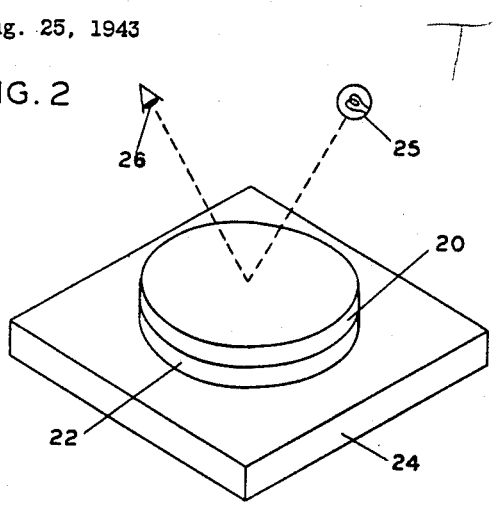
FIG. 3            FIG. 4            FIG. 5
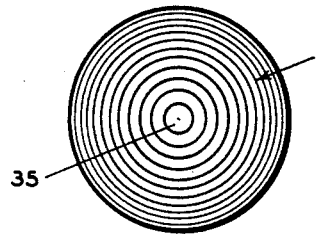   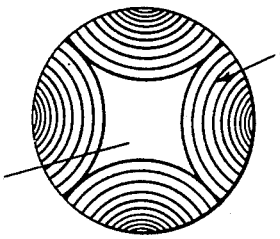   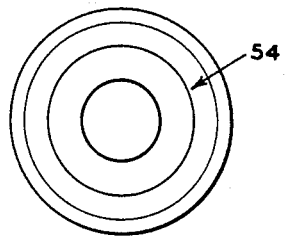
FIG. 3a           FIG. 4a           FIG. 5a
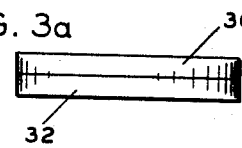   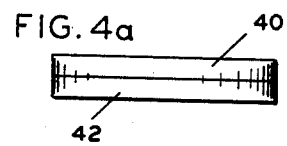   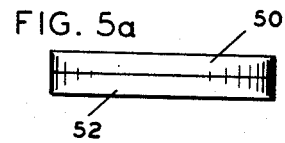
FIG. 6                               FIG. 7
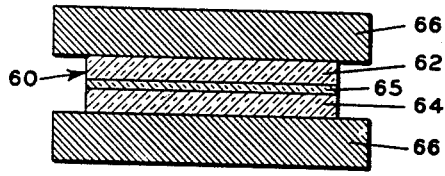
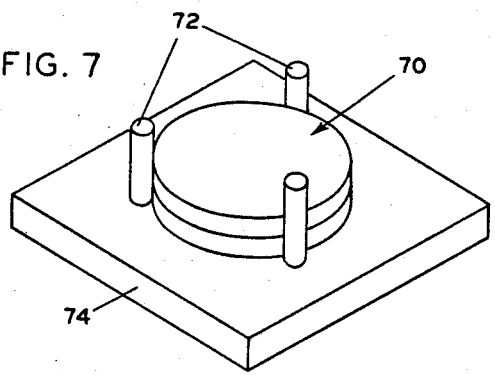
INVENTOR.
Alexander Thomas
BY
Donald L. Brown
Attorney Patented May 6, 1947

2,420,270

UNITED STATES PATENT OFFICE 2,420,270

LAMINATED OPTICAL FILTER

Alexander Thomas, Weston, Mass., assignor to Polaroid Corporation, Cambridge, Mass., a corporation of Delaware Application August 25, 1943, Serial No. 499,937

4 Claims. (Cl. 88—1)

This invention relates to optical filters, and more particularly to new and improved laminated optical filters.

A principal object of the invention is to provide optical filters of high quality which may be used in cameras and other precision optical instruments.

An additional object is to provide such optical filters in laminated form comprising a pair of outer glass components bonded together by one or more adhesive layers, and particularly to provide such laminated filters wherein the glass components are ordinary, commercial plate or drawn glass.

Another object is to provide such laminated filters wherein any variations from optical flatness in the outer surface of one glass component are compensated for by substantially equal variations from optical flatness in the opposite direction in the outer surface of the other glass component.

A still further object is to provide laminated optical filters having the above characteristics wherein the central, adhesive layer comprises selectively light-absorbing material, and particularly wherein said central layer comprises a layer of a transparent plastic material, such as cellulose acetate or other suitable cellulose derivative, or a vinyl compound such as polyvinyl alcohol, having a suitable dye or other selectively light-absorbing material incorporated therein and bonded between said glass components by two layers of an adhesive such as a polyvinyl acetal resin.

A still further object is to provide optical filters of high quality comprising outer elements possessing surfaces having variations from optical flatness, and particularly to provide high quality optical filters comprising outer elements formed of commercial plate glass.

Additional objects and advantages will in part appear and in part be pointed out in the course of the following description of one or more embodiments of the invention, which are given as non-limiting examples, in connection with the accompanying drawings, in which:

Figure 1 is a perspective view, partly broken away, illustrating diagrammatically a filter comprising an embodiment of the invention;

Figure 2 is a diagrammatic perspective view illustrating the inspection and matching of glass components;

Figures 3, 4 and 5 are detailed views in plan illustrating the appearance of said glass components at different stages of inspection and matching illustrated in Fig. 2;

Figures 3a, 4a and 5a are detailed views in elevation illustrating the arrangement of glass components producing the patterns illustrated in Figs. 3, 4 and 5 respectively;

Figure 6 is a diagrammatic view in section illustrating assembly and lamination of a filter; and Figure 7 is a diagrammatic view in perspective illustrating a jig with filter components held therein for lamination.

In the drawings, Fig. 1 shows a filter 10 produced in accordance with the invention and comprising a pair of outer, glass components 12 and 14, bonded together by means of a central, composite layer. The central, composite layer just mentioned is in turn shown as comprising three layers, two outer layers 16 comprising adhesive material, and a central, sheet-like layer 18 comprising a suitable transparent plastic material such for example as cellulose acetate or other cellulose derivative, or a vinyl compound such as polyvinyl alcohol, or any other suitable material. If filter 10 is to be selectively light-absorbing, the light-absorbing agent is preferably incorporated in layer 18. For example, if filter 10 is designed as a color filter, layer 18 may have one or more dyes incorporated therein. If filter 10 is designed as a light-polarizing filter, layer 18 may comprise light-polarizing material such for example as one of the sheet light-polarizing materials sold under the trade-mark "Polaroid." If filter 10 is intended for some other purpose in which no light-absorbing properties are required, as for example a photographic window or analogous device, layer 18 may be dispensed with and a single adhesive layer used, or layer 18 may comprise clear plastic material such as cellulose acetate used for ease in handling adhesive layers 16.

Layers 16 in Fig. 1 may comprise any material which will have an adequate degree of adhesion for glass and for the material of central layer 18. Examples of adhesive materials found suitable for the purposes of the invention include vinyl compounds, particularly polyvinyl acetal resins such as polyvinyl butyral, acrylic and methacrylic acid esters, and many relatively low molecular weight resins and gums. Illustrative examples of suitable laminating methods and materials are given in detail hereinafter.

In accordance with the invention, glass components 12 and 14 are so chosen and matched before assembly to form filter 10 that imperfections and variations from optical flatness on the outer surface of one component are largely compensated for by substantially equal and opposite imperfections and variations from optical flatness in the outer surface of the other component. That is to say, if the outer surface of component 12 is slightly convex, the outer surface of component 14 will be concave to a substantially similar degree. Thus, regardless of the degree of parallelism between the two surfaces of either component individually, the outer surfaces of the composite filter—which are its active surfaces—will be substantially parallel. Since the quality of an optical filter depends on the parallelism of its active surfaces, the result will be that filter 10 will possess an extremely high optical quality, as is explained in more detail hereinafter.

As has already been pointed out, one object and advantage of the present invention is the use of ordinary, commercial plate or drawn glass in the production of optical filters. That is to say, glass components 12 and 14 in Fig. 1 may comprise ordinary, commercial plate or drawn glass. In that event, inspection of a multiplicity of such glass components and the classification thereof according to the condition of their surfaces is involved. In general, the surfaces of such glass components will be found to depart from optical flatness in one of three principal ways: they will be concave, convex, or saddle-shaped, i. e., a combination of concave and convex. There will also be many other, more complex imperfections, but the three classifications mentioned predominate, and the classification and matching of the more varied and complex imperfections are not usually sufficiently profitable to be practical. It should be noted, however, that the predominant variations from flatness are usually not uniform—i. e., the surfaces are usually not truly spherical—but this factor is successfully controlled as described hereinafter.

In classifying the glass components, each component is mounted on an optically flat glass plate and inspected in monochromatic light. This step is illustrated diagrammatically in Fig. 2, wherein glass component 20 is shown mounted on optical flat 22, which in turn rests on any suitable base 24, preferably light-absorbing. Lamp 25 represents any suitable source of monochromatic light, and the eye of the observer is represented at 26. The appearance of the predominant classifications of glass components during inspection under monochromatic light is illustrated diagrammatically in Figs. 3 and 4. If the surface of component 30 in contact with optical flat 32 in Fig. 3a is concave or convex, a fringe pattern in the form of a multiplicity of concentric circles or ellipses 34 will be seen as illustrated in Fig. 3. The number of fringes 34 depends on the degree of concavity or convexity of the inspected surface, i. e., the more concave or convex the surface, the more fringes will be seen. The density or dispersion of fringes 34 will indicate the uniformity of the inspected surface, and in a uniformly curved surface, the number of fringes should increase in proportion to the radius from center 35 of the fringe pattern.

Since both concave and convex surfaces give identical patterns, and since concave surfaces must be matched with convex and vice versa, it is important to distinguish between them. Whether the inspected surface is concave or convex may be determined by raising and lowering of the observer's head. If the fringes appear to move out from center 35 of the pattern as the observer's head is lowered, the inspected surface is convex, and if the fringes appear to move towards center 35 as the observer's head is lowered, the inspected surface is concave. It will of course be understood that if the surface of component 30 in contact with element 32 were optically flat, either no fringe pattern would appear, or the entire area would be covered with one broad fringe.

Fig. 4 illustrates the fringe pattern observed during inspection if the surface of component 40 in contact with optical flat 42 in Fig. 4a is concave-convex or saddle-shaped. Said pattern is more or less the reverse of that shown in Fig. 3 and comprises four sets of circles or ellipses 44 concentric about points beyond the surface of component 40 and dividing said surface into four quadrants about center 45. The number and density of fringes 44 are dependent upon the same conditions explained above in connection with fringes 34 in Fig. 3. As has already been mentioned, more complex variations from optical flatness in the surfaces of the glass components will give more complex fringe patterns, for example, combinations of the patterns illustrated in Figs. 3 and 4. Since, however, the simple patterns predominate and repeat with much greater frequency and since they are, therefore, much more easily matched, it is generally not practical to attempt matching of the more complex patterns. It will of course be understood that in general the fringe pattern will not be as uniformly circular or elliptical as they are illustrated in Figs. 3 and 4 and are more likely to be distorted from uniformity in varying degrees.

The purpose of the above described inspection is twofold. In the first place, each glass component will in general have one surface more nearly flat than the other. Each surface is accordingly inspected to determine which is the better, and the better surface is then preferably marked in some way for ready identification. In the second place, a relatively large number of components are preferably inspected together and are thereby classified according to the characteristics of the best surface of each, i. e., concave, convex, or saddle-shaped. Preferably each of these classifications will be divided into a plurality of subclasses according to the degree of flatness as determined by the number of fringes in the inspection pattern. For example, if each component be approximately 4½" in diameter, the subclasses may conveniently comprise components showing not more than 4 fringes, 5 to 8 fringes, 9 to 12 fringes, and so on up to a maximum beyond which the components will be found too uneven for practical use. Said maximum depends on the optical quality desired in the finished filter. For example, with components 4½" in diameter designed ultimately as camera filters, 24 fringes will be found an effective maximum, but this limit may vary widely with filters designed for different ultimate uses.

After a multiplicity of components have been inspected and classified, it is next necessary to match pairs of components of opposite surface characteristics. This is performed in substantially the same manner as the inspecting step illustrated in Fig. 2 and is further illustrated in Figs. 5 and 5a. A glass component 52 of predetermined surface characteristics is placed with its better surface uppermost, and a second component 50 is superimposed thereon with its better surface downwards and in contact with the upper surface of component 52. Component 50 will be chosen from a group of components whose surface characteristics are most nearly equal and opposite to those of component 52. That is to say, if for example the better surface of component 52 is concave to the extent of 10 fringes, component 50 will be taken from the group of components whose better surfaces are convex to from 9 to 12 fringes. Similarly if component 52 has a saddle-shaped surface, component 50 will also be chosen from the group having their better surfaces saddle-shaped to substantially the same number of fringes.

One component, for example component 50, is then rotated with respect to the other in monochromatic light as illustrated in Fig. 2 until a minimum number of fringes is seen when the adjacent surfaces of the components are in contact or are parallel. In carrying this out, it may be desirable to tilt one component slightly with respect to the other in order to bring their contacting faces into as nearly absolute parallelism as possible. If the two contacting component surfaces are absolutely parallel, no fringes or only one broad fringe will be seen, but such results are not usual. On the other hand, said surfaces may match each other sufficiently for the purpose of the invention without being absolutely parallel, with the permissible variation from parallelism depending upon the ultimate desired quality of the filter. For example, if components 50 and 52 are approximately 4½" in diameter and the finished filter is intended for use with a high resolving power camera, components whose surfaces match to not more than 4 fringes will be found to combine to form a finished laminated filter which when used with the lens system of the camera will provide a system having a resolving power of 5 seconds or less.

If in the above, the minimum number of fringes is greater than the predetermined maximum, component 50 should be returned to the stock and other components from the same group tried until a satisfactory match is obtained. It has been found that using glass components of commercial plate glass, the chances of obtaining a satisfactorily matching pair are about 60%. That is to say, if for example a total of 400 components is initially inspected and classified, pairs will be found for approximately 60%, or enough to make 120 filters. The remaining components may, of course, match components from another batch, and in general the higher the number of components inspected and classified, the higher will be the ultimate percentage yield of filters. If, on the other hand, a component fails to match one of six or seven components from the opposite classification, it will generally prove unsatisfactory to try it further and it may be discarded. It should be noted that, in general, practice of the invention will be more efficient if after a multiplicity of components have been classified, each newly inspected component is subjected to matching immediately upon classification.

Fig. 5 illustrates the appearance in monochromatic light of a pair of satisfactorily matching components, with fringe pattern 54 comprising only three concentric fringes. Two components having surfaces which match each other this closely will in general combine to form a filter as shown in Fig. 1 having a high quality and giving a high degree of definition for substantially all optical purposes. It should be noted that the fringe pattern of satisfactorily matching components may not comprise concentric fringes but may very probably comprise a pattern like that illustrated in Fig. 4 but with a smaller number of fringes as in Fig. 5. It should also be noted that preferred results are obtained with the most uniform fringe patterns, i. e., with a minimum density of fringes as nearly as possible proportional to the radius of the fringe pattern.

After matching, the matched components 50 and 52 should preferably be marked in some way to indicate the proper relative orientation of their surfaces in the finished lamination. For example, they may be held firmly together in the relative positions showing the minimum number of fringes, and a matching notch may be ground adjacent the edge of each of their outer surfaces. It will be understood that such notches will in no way affect the quality of the finished filter, since the outer surfaces of components 50 and 52 in Fig. 5 will become the inner surfaces of the finished lamination and the notches will be filled and concealed by adhesive material. In addition, the notched portions may be eliminated during the edge-grinding of the finished filter.

After a pair of glass components are matched they are then laminated together. As pointed out above, this may be accomplished with a single layer of adhesive, but for preferred results a three-ply layer is used comprising, as shown in Fig. 1, two layers 16 of adhesive and a central layer 18 of sheet plastic material, and if the finished filter is intended as a light absorber, the central layer 18 will preferably be used and the desired light-absorbing material incorporated therein. Preferred results have been obtained by using a layer 18 of cellulose acetate approximately .003" in thickness having one or more dyes or other light-absorbing material incorporated therein. For a red filter, oil dyes such as Calco Oil Red N-1700 or Du Pont Oil Red are examples of satisfactory dyes, and for a yellow filter Grasol Fast Yellow 3GL has been found satisfactory. For a polarizing filter, satisfactory results have been obtained with any of the polarizing films sold under the trade mark "Polaroid."

As pointed out above, there is a relatively wide choice of adhesives which may be used for laminating the filters of the invention. An example of one material found particularly useful in conjunction with any of the cellulose acetate central layers is polyvinyl butyral, such as that sold under the trade name "Vinylite XYSG," plasticized with raw castor oil in a ratio of two parts of the former to three parts of the latter. When using an adhesive of this type, lamination is preferably carried out by first coating each surface of central layer 18 with a layer of the desired adhesive material, for example to a thickness of approximately .010 inch. The resulting composite central layer is then inserted between a pair of glass components which have been rotated with respect to each other so that their matching surfaces become the outer surfaces of the lamination. During lamination, care should be taken to retain said components with their surfaces in the proper relative orientation. As suggested above, this may be accomplished conveniently by matching opposing notches ground on the surfaces of the components which become the inner surfaces in the lamination. It will be apparent that when two components which match in the manner illustrated in Fig. 5 are each rotated through 180° on parallel diameters, their matching surfaces will retain the same relation as in the position indicated in Fig. 5. It should be noted that it is not essential that the central layer of the lamination be of absolutely uniform thickness if the outer surfaces of the two glass components are properly matching. For example, the filters of the present invention can tolerate as much as 20 minutes of arc or more of wedge or lack of parallelism between their outer surfaces without an appreciable effect on their quality.

After the lamination is assembled, it is then preferably inserted between pressure elements such, for example, as those of a platen press, and subjected to heat and pressure to force out any air or vapor bubbles entrapped in the lamination. This is illustrated in Fig. 6, wherein filter 60 comprising glass components 62 and 64 and central layer 65 is shown between two pressure elements 66 of a platen press. The adjacent surfaces of elements 66 are preferably substantially parallel.

The degree of heat and pressure applied to the lamination and the time of application depends to a considerable extent on the adhesive used. For preferred results, the pressure will be kept low in order to minimize the introduction of any strain into the lamination. In the above example, using the above polyvinyl butyral-castor oil adhesive, a pressure of 100 lbs. per square inch for approximately 2½ minutes at 230° F. is satisfactory. The control of heat and pressure will be readily understood by those skilled in the art, and many variations can be made accordingly without departing from the scope of the invention. It may be stated in general, however, that the use of thin glass or permitting excessive flow of adhesive during the application of pressure when laminating should be avoided, since either tends to prevent the achievement of the desired degree of resolving power in the finished filter.

It appears that the above application of pressure tends to distort the lamination, and after cooling to room temperature, the filter components will generally be found not to match as well as before. For example, if the glass components originally matched to 2 or 3 fringes, the lamination at this stage may show 10 fringes or more, although in some cases this may not be true and the lamination may be found sufficiently good for use without any further treatment. In general, however, the filters of the invention will be improved by subjecting them to a further annealing comprising relatively prolonged heating at a temperature at which the adhesive softens but does not tend to flow, followed by slow cooling to room temperature.

During the annealing the lamination can recover from any strain or distortion imparted thereto by the above pressing. The temperature and time of the annealing is largely dependent upon the size and thickness of the filter elements and upon the adhesive used, and variations therein will readily be understood by those skilled in the art and are to be construed as coming within the scope of the invention. In the above example, the annealing may consist in baking for approximately 18 hours at a temperature of approximately 210° F., and when the filter has then been permitted to cool to room temperature, it will be found to have improved materially with respect to resolving power. Under some conditions it may appear that all air bubbles cannot be eliminated from the lamination without exerting fairly high pressure during pressing. In such case preferred results will be obtained by using relatively low pressure and then eliminating said bubbles by carrying out the annealing in an autoclave, for example, an air autoclave at a pressure of approximately 100 lbs. per square inch.

As has been pointed out, the invention is not limited to the above-described adhesive or laminating technique. Highly satisfactory results have been obtained by using adhesive layers of partially polymerized transparent esters of acrylic or methacrylic acid and then completing polymerization in situ. An illustrative example of such adhesives is butyl methacrylate, which may be partially polymerized to a viscosity resembling that of molasses and then applied to the two glass components. If a central layer is used, the adhesive may first be applied to both surfaces thereof, and the compound layer may then be assembled between the matched glass components as described above.

Partial polymerization of the adhesive is preferably carried out with the aid of a suitable catalyst, such for example as benzoyl peroxide used in proportions of 20 grams of the latter to each liter of butyl methacrrylate. After the lamination is assembled, polymerization of the adhesive is completed by means of heat. In this example, satisfactory results will be obtained by heating for approximately 20 hours at a temperature of 60° C. in an atmosphere either of carbon dioxide or of butyl methacrylate monomer. Further polymerization, as described above, is particularly advantageous in maintaining the high optical quality of the finished filter when relatively thin glass components are used. This further polymerization may be effected by including in the heating chamber an open container of monomer containing a small amount of a suitable inhibitor such as hydroquinone and containing no catalyst, with the result that the monomer will continually vaporize and thus prevent evaporation of monomer from the adhesive layer. After the heating is completed, the filters may be cleaned, following which it appears helpful to carry out a further heat treatment at 60° C. for an additional 24 hours to insure complete polymerization as well as to test for separations and other defects.

It should be pointed out that it is important that the filter components be retained in their proper relative positions during polymerization of the adhesive, and this is patricularly true when the filter components have been matched as previously described. It is also important that as little pressure as possible be exerted on the lamination during polymerization. Preferably the glass components should be held horizontally but with no vertical pressure other than that supplied by their own weight. This may be accomplished by means of any suitable jig, as for example as illustrated in Fig. 7, wherein laminated filter 70 is shown held by three peg members 72 mounted on a suitable supporting plate or board 74. It will be apparent that a multiplicity of said pegs may be mounted on the same supporting member in order to hold a multiplicity of laminations during polymerization. A similar arrangement will be found useful in laminating glass or plastic components other than flats, as for example in the production of cemented lenses, and it is to be understood that such use of the laminating technique of the invention is to be construed as coming within the scope hereof.

As stated at the outset, the present invention has been found particularly adapted for the provision of filters comprising glass components cut from commercial plate or drawn glass of ordinary quality, and with such materials and without any grinding and polishing other than that conventional in the plate glass art, optical filters have been made which possess high quality substantially equal to those of the finest ground and polished filters. For example, if an individual glass element of the character described is added to a lens system having a resolving power of one second or less of arc, it may cause the system to have a resolving power of the order of about 30 seconds or more of arc. On the other hand, if glass elements of this character are matched and arranged in pairs in accordance with the invention to provide a high quality filter such as that described and such a filter is added to the same system, the system will have a resolving power of about 5 seconds or less of arc. It should also be noted that the filters herein described may be made successfully by relatively unskilled help without complicated training.

One other factor of some importance should be noted. It appears that preferred results are obtained with individual glass components which are substantially homogeneous in composition, since otherwise the quality of the laminated filter will be disadvantageously affected even when its individual components match substantially perfectly.

Since certain changes in the articles which embody the invention may be made without departing from its scope, it is intended that all matter contained in the above description or shown in the accompanying drawing shall be interpreted as illustrative and not in a limiting sense.

What is claimed is:

1. In an optical filter comprising a plurality of light-transmitting elements arranged in superimposed position with respect to each other, in combination, two outer elements formed of glass, each outer element having surfaces which are generally plane with respect to each other, the outer surface of one of said outer elements departing from optical flatness by having curved portions thereof lying at elevated positions with respect to other curved portions thereof, the outer surface of the second glass element also departing from optical flatness by having curved portions thereof elevated with respect to other curved portions thereof but having the more elevated curved portions corresponding in location to the lesser elevated curved portions of said first-named surface whereby to be complementary thereto, said outer elements being arranged with respect to each other so that the elevated curved portions on the outer surface of one element lie substantially opposite the less elevated curved portions of the outer surface of the other element and the less elevated curved portions of the outer surface of the first-named element lie substantially opposite the more elevated curved portions of the outer surface of the other element, the thickness of the filter from outer surface to outer surface being substantially uniform throughout its entirety.

2. In an optical filter comprising a plurality of light-transmitting elements arranged in superimposed position with respect to each other, in combination, two outer elements formed of glass, each outer element having surfaces which are generally plane with respect to each other, the outer elements having curved portions located at random positions on the two surfaces thereof adapted to form the outer surfaces of the filter whereby said outer surfaces depart from optical flatness, said curved portions being individually concave and individually convex, any concave curved portion on said outer surface of one glass element being positioned substantially directly opposite to a convex curved portion on said outer surface of the second glass element and any convex curved portion on said outer surface of the first-mentioned glass element being positioned substantially opposite to a concave curved portion on said outer surface of the second glass element, the curvatures on the oppositely arranged concave and convex curved portions being complementary to each other and of similar degree, whereby the said outer surfaces of the filter are substantially parallel with respect to each other at the said random positions, and means comprising a light-transmitting adhesive material interposed between the inner surfaces of said two outer elements securing said outer elements together in an integral structure in said desired arrangement.

3. In an optical filter comprising a plurality of layers of light-transmitting material arranged in superimposed position with respect to each other, in combination, a central layer formed of plastic material having the property of predeterminedly modifying light transmitted through the filter and a glass element having surfaces which are generally plane positioned on each side of said central layer and forming an outer layer of the filter, the outer elements having curved portions located at random positions on the two surfaces thereof adapted to form the outer surfaces of the filter whereby said outer surfaces depart from optical flatness, said curved portions being individually concave and individually convex, any concave curved portion on said outer surface of one glass element being positioned substantially directly opposite to a convex curved portion on said outer surface of the second glass element and any convex curved portion on said outer surface of the first-mentioned glass element being positioned substantially opposite to a concave curved portion on said outer surface of the second glass element, the curvatures on the oppositely arranged concave and convex curved portions being complementary to each other and of similar degree, whereby the said outer surfaces of the filter are substantially parallel with respect to each other at the said random positions.

4. In an optical filter comprising a plurality of layers of light-transmitting material arranged in superimposed position with respect to each other, in combination, a central layer formed of plastic material having the property of predeterminedly modifying light transmitted through the filter and a glass element having surfaces which are generally plane positioned on each side of said central layer and forming an outer layer of the filter, the outer elements having curved portions located at random positions on the two surfaces thereof adapted to form the outer surfaces of the filter whereby said outer surfaces depart from optical flatness, said curved portions being individually concave and individually convex, any concave curved portion on said outer surface of one glass element being positioned substantially directly opposite to a convex curved portion on said outer surface of the second glass element and any convex curved portion on said outer surface of the first-mentioned glass element being positioned substantially opposite to a concave curved portion on said outer surface of the second glass element, the curvatures on the oppositely arranged concave and convex curved portions being complementary to each other and of similar degree, whereby the said outer surfaces of the filter are substantially parallel with respect to each other at the said random positions, and means comprising light-transmitting adhesive material interposed between the inner surfaces of said two outer elements and said central layer and securing said elements together in an integral structure in said arrangement.

ALEXANDER THOMAS.

REFERENCES CITED

The following references are of record in the file of this patent:

UNITED STATES PATENTS

| Number | Name | Date |
|---|---|---|
| 2,336,273 | Malm | Dec. 7, 1943 |
| 2,258,991 | McNally | Oct. 14, 1941 |
| 2,209,435 | Watkins et al. | July 30, 1940 |
| 2,193,035 | Matthews et al. | Mar. 12, 1940 |
| 1,866,718 | Mihalyi | July 12, 1932 |
| 2,253,054 | Tuttle et al. | Aug. 19, 1941 |
| 2,091,615 | Rohm et al. | Aug. 31, 1937 |
| 1,692,619 | Brown | Nov. 20, 1928 |
| 2,060,104 | Moulton | Nov. 10, 1936 |
| 1,098,342 | Benedictus | May 26, 1914 |
| 2,237,567 | Land | Apr. 8, 1941 |
| 2,189,293 | Ostromislensky | Feb. 6, 1940 |
| 2,129,722 | Woodhouse | Sept. 13, 1938 |
| 2,339,433 | Staehle | Jan. 18, 1944 |
| 2,092,789 | Tillyer | Sept. 14, 1937 |

FOREIGN PATENTS

| Number | Country | Date |
|---|---|---|
| 697,040 | German | Oct. 19, 1940 |

OTHER REFERENCES

Hardy & Perrin text, The Principles of Optics, 1932, McGraw Hill Book Co., N. Y., pages 345–347.

Ordinance Dept., Document 2037 Text., The Mfg. of Optical glass and of Optical Systems, 1921, Govt. Printing Office, pages 242, 243, 247–248, 255.

Deve text, Optical Workshop Principles, 1936, as Translated by Tippell, 1942, 1943 (pages 270, 271), supplied by Jarrell-Ash Co., 165 Newbury St., Boston, Mass.

Pixley text, Optical Primer, 1916, publ. by Hardy & Co., 10 S. Wabash Ave., Chicago, pages 121 to 124, inclusive.

Emsley et al. text, Ophthalmic Lenses, 1935 3rd ed., publ. Hatton Press Ltd., 72 Fleet Street, London, page 15.